Patented Oct. 4, 1932

1,880,447

UNITED STATES PATENT OFFICE

WINFRID HENTRICH AND MAX HARDTMANN, OF WIESDORF-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

NITRO-HALOGENQUINAZOLINE AND THE PROCESS OF PRODUCING SAME

No Drawing. Application filed November 30, 1929, Serial No. 410,870, and in Germany December 3, 1928.

The present invention relates to a process of preparing nitro-halogenquinazolines and to the new products obtainable thereby, more particularly it relates to compounds of the probable general formula:

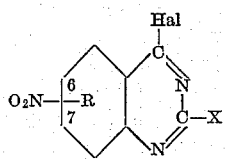

wherein "Hal" represents a halogen atom, X stands for hydrogen or a radical of the benzene series, and the $NO_2$ group is attached to the 6— or 7— position, and wherein the benzine nucleus R may be further substituted.

Our new compounds are obtainable by reacting upon a nitro-hydroxy-quinazoline of the general formula:

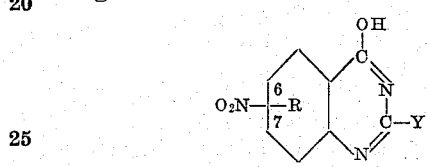

wherein Y stands for hydrogen or a radical of the benzene series, and the $NO_2$ group is attached to the 6— or 7— position, and wherein the benzene nucleus R may be further substituted, with the calculated amount of a phosphorhalogen compound, such as phosphorus pentachloride and phosphorous pentabromide and phosphorous oxychloride, at elevated temperature, say at a temperature about 80 to 140° C. The process is advantageously carried out in the presence of an inert organic solvent, such as chlorobenzene, while using a small excess of the phosphorhalogen compound. The reaction is complete when the evolution of hydrohalic acid ceases. When working with phosphorus oxychloride as halogenating agent, the reaction can only be effected under superatmospheric pressure. The starting nitro-hydroxy-quinazolines are obtainable according to known processes, for example by melting together nitro-anthranilic acid and a compound of the general formula: $H_2N.CO.R'$, $R'$ meaning hydrogen or aryl.

Our new compounds are generally yellowish colored crystalline substances, being soluble in the usual organic solvents. They represent valuable intermediate products in the manufacture of dyestuffs and of pharmaceutical substances.

The invention is illustrated by the following examples, without being limited thereto:

Example 1

*6-nitro-4-chloro-quinazoline*

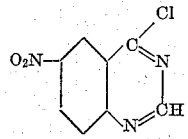

191 parts by weight of 6-nitro-4-hydroxy-quinazoline (compare Bogert, Journal of the American Chemical Society, vol. 34, page 524, and vol. 41, page 2067) are stirred with 250 parts by weight of phosphorus oxychloride and heated with 210 parts by weight of phosphorus pentachloride at 110–130° C. When the evolution of hydrogen chloride ceases the phosphorus oxychloride is distilled off in the vacuum of the water-jet vacuum pump. At 170° C. a sublimation of the chloronitro compound begins, then up to 210° C. the greater part of the 6-nitro-4-chloroquinazoline distils over with slight decomposition of the residue. When working up larger quantities or less pure materials distillation is advantageously avoided (compare Example 2). The 6-nitro-4-chloroquinazoline crystallizes in the form of yellow needles, melting at 128° C.; it is very readily soluble in acetone and ethyl acetate and more difficulty soluble in benzene, ether and hot ligroin. Its odor slightly resembles that of acetamide. The chlorine in the 4-position is very readily replaceable and even with cold water the reformation of 6-nitro-4-hydroxyquinazoline takes place after some time.

EXAMPLE 2

*7-nitro-4-chloro-quinazoline*

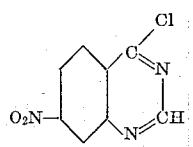

191 parts by weight of 7-nitro-4-hydroxy-quinazoline (obtainable from 4-nitro-2-aminobenzoic acid and formamide by heating for 6 hours first at 140° C. and finally at 170° C.) are stirred with 260 parts by weight of phosphorus oxychloride; 208 parts by weight of phosphorus pentachloride are then added, and the mixture is heated in an oil bath to gentle boiling until the evolution of hydrochloric acid ceases. To the reaction mixture 300–400 parts by weight of dry chlorobenzene are added and the phosphorus oxychloride is distilled off whereby over-heating is carefully avoided, until the thermometer indicates the beginning of the distillation of chlorobenzene. Thereafter the chlorobenzene and some still adhering phosphorus oxychloride are distilled off in the vacuum of the water-jet vacuum pump to a bath temperature of 110° C. The residue is comminuted and extracted with boiling dry benzene, filtered from the residue and evaporated while carefully excluding access of moisture, until the separation of crystals begins. The 7-nitro-4-chloroquinazoline crystallizes in the form of yellowish needles; it melts at 148° C. It is readily soluble in acetone and ethyl acetate, more difficultly soluble in cold benzene and fairly readily soluble in hot benzene. By heating to a bath temperature of 200–230° C. the 7-nitro-4-chloroquinazoline sublimes in the vacuum of the water-jet vacuum pump with partial decomposition of the residue. Water re-forms the 7-nitro-4-hydroxyquinazoline.

EXAMPLE 3

*6-nitro-4-chloro-7-methyl-quinazoline*

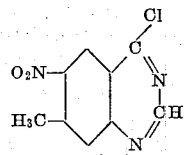

(a) Preparation of 6-nitro-4-hydroxy-7-methylquinazoline: 196 parts by weight of 5-nitro-2-amino-4-methylbenzoic acid (nitro homoanthranilic acid) are first heated for 6 hours with 1000 parts by weight of formamide at 140–150° C. The mixture first forms a solution, but after some time the melt becomes almost solid. As soon as the evolution of water and ammonia becomes more slow, the reaction is completed by heating the mixture for a further 2 hours at 170–175° C. The cooled melt is boiled with water to remove the excess of formamide. The undissolved portion is dissolved in the requisite amount of caustic soda solution and the sodium salt of the 6-nitro-4-hydroxy-7-methylquinazoline is precipitated as a yellowish crystalline compound which has no distinct crystal form. By means of hydrochloric acid the free 6-nitro-4-hydroxy-7-methylquinazoline is obtained from the salt. It melts at 278° C.; when crystallized from pyridine it forms yellowish granular crystals.

(b) Preparation of 6-nitro-4-chloro-7-methylquinazoline: 205 parts by weight of the above substance are stirred with 300 parts by weight of phosphorus oxychloride. 210 parts by weight of phosphorus pentachloride are then added, and the mixture is heated at 120–130° C. until the evolution of hydrochloric acid ceases. Thereupon the phosphorus oxychloride is first distilled off the vacuum of the water-jet vacuum pump at water bath temperature; after that the temperature is raised to about 190° C. and the 6-nitro-4-chloro-7-methylquinazoline distils over. It melts at 110° C.; it is readily soluble in hot benzene and acetone.

EXAMPLE 4

*7-nitro-4-chloro-2-phenyl-quinazoline*

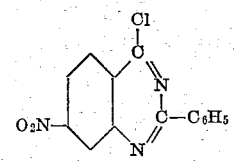

(a) Preparation of 7-nitro-4-hydroxy-2-phenylquinazoline: 210 parts by weight of the ethylester of 4-nitro-2-amino-benzoic acid are heated in a closed vessel for 10 hours at 140–150° C. with a solution of 28 parts by weight of sodium in 600 parts by weight of absolute alcohol, which contains 1% of ammonia and 120 parts by weight of benzonitrile. The precipitate obtained is filtered by suction, dissolved in the requisite amount of caustic soda solution, freed from adhering unchanged benzonitrile by extraction with ether or by passing through water vapor. The 7-nitro-4-hydroxy-2-phenylquinazoline obtained is precipitated by acidifying the solution. After drying it melts at 240–250° C. with decomposition (depending on the rapidity of the heating).

(b) Preparation of 7-nitro-4-chloro-2-phenylquinazoline: The conversion of the 4-hydroxy compound to the 4-chloro derivative and the working up of the reaction mixture are effected as described in Example 2. The 7-nitro-4-chloro-2-phenylquinazoline crystallizes from boiling toluene in the form of small yellow needles. It is very readily decomposed when exposed to moisture. The analysis gave 7.82% of chlorine (calculated 8.04%); 6.68% of nitrogen, (calculated 6.80%).

In a manner analogous to the preparation of the above described phenylquinazoline compounds, quinazoline substituted in the phenyl residue may be built up.

We claim:

1. The process which comprises causing a phosphorus halogen compound and a compound of the probable general formula:

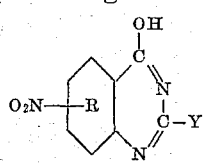

wherein Y represents hydrogen or a radical of the benzene series, the $NO_2$ group stands in one of the positions 6 and 7, and wherein the benzene nucleus R may be further substituted by alkyl, to react upon each other in about equimolecular proportions at a temperature between about 80 and 140° C.

2. The process which comprises causing phosphorus pentachloride and a compound of the probable general formula:

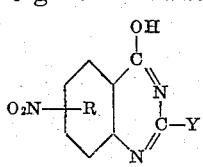

wherein Y represents hydrogen or phenyl, the $NO_2$ group stands in one of the positions 6 and 7, and wherein the benzene nucleus R may be further substituted by alkyl, to react upon each other in about equimolecular proportions at a temperature between about 80 and 140° C. and in the presence of phosphorus oxychloride as a solvent.

3. The process which comprises causing phosphorus pentachloride and 6-nitro-4-hydroxyquinazoline to react upon each other in about equimolecular proportions at a temperature of about 110 to 130° C. and in the presence of phosphorus oxychloride as a solvent, until the evolution of hydrogen chloride has ceased.

4. As new products the compounds of the probable general formula:

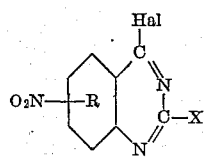

wherein "Hal" represents a halogen atom, the $NO_2$ group stands in one of the positions 6 and 7, X stands for hydrogen or a radical of the benzene series, and wherein the benzene nucleus R may be further substituted by alkyl, said compounds being generally yellowish colored crystalline substances, soluble in the usual organic solvents.

5. As new products the compounds of the probable general formula:

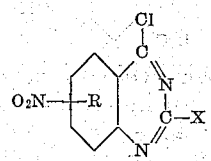

wherein the $NO_2$ group stands in one of the positions 6 and 7, X represents hydrogen or a radical of the benzene series, and wherein the benzene nucleus R may be further substituted by alkyl, said compounds being generally yellowish colored crystalline substances, soluble in the usual organic solvents.

6. As new products the compounds of the probable general formula:

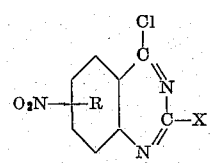

wherein the $NO_2$ group stands in one of the positions 6 and 7, X stands for hydrogen or phenyl, and wherein the benzene nucleus R may be further substituted by alkyl, said compounds being yellowish colored crystalline substances, soluble in the usual organic solvents.

7. As a new product the compound of the probable formula:

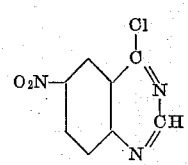

being a yellow colored crystalline substance, melting at 128° C., being very readily soluble in acetone and ethyl acetate and more difficultly soluble in benzene, ether and hot ligroin.

8. As a new product the compound of the probable formula:

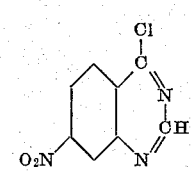

being a yellow colored crystalline substance, melting at 148° C. and being very readily soluble in acetone and ethyl acetate and more difficultly soluble in benzene, ether and hot ligroin.

9. As a new product the compound of the probable formula:
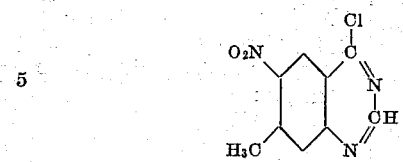
being a yellowish colored substance melting at 110° C. and being readily soluble in hot benzene and acetone.
In testimony whereof, we affix our signatures.
WINFRID HENTRICH.
MAX HARDTMANN.